July 31, 1945.  C. R. WASEIGE  2,380,889
POLYENGINE BIPROPELLER DRIVE
Filed July 14, 1942  4 Sheets-Sheet 1

INVENTOR:
CHARLES R. WASEIGE
BY
ATTORNEY.

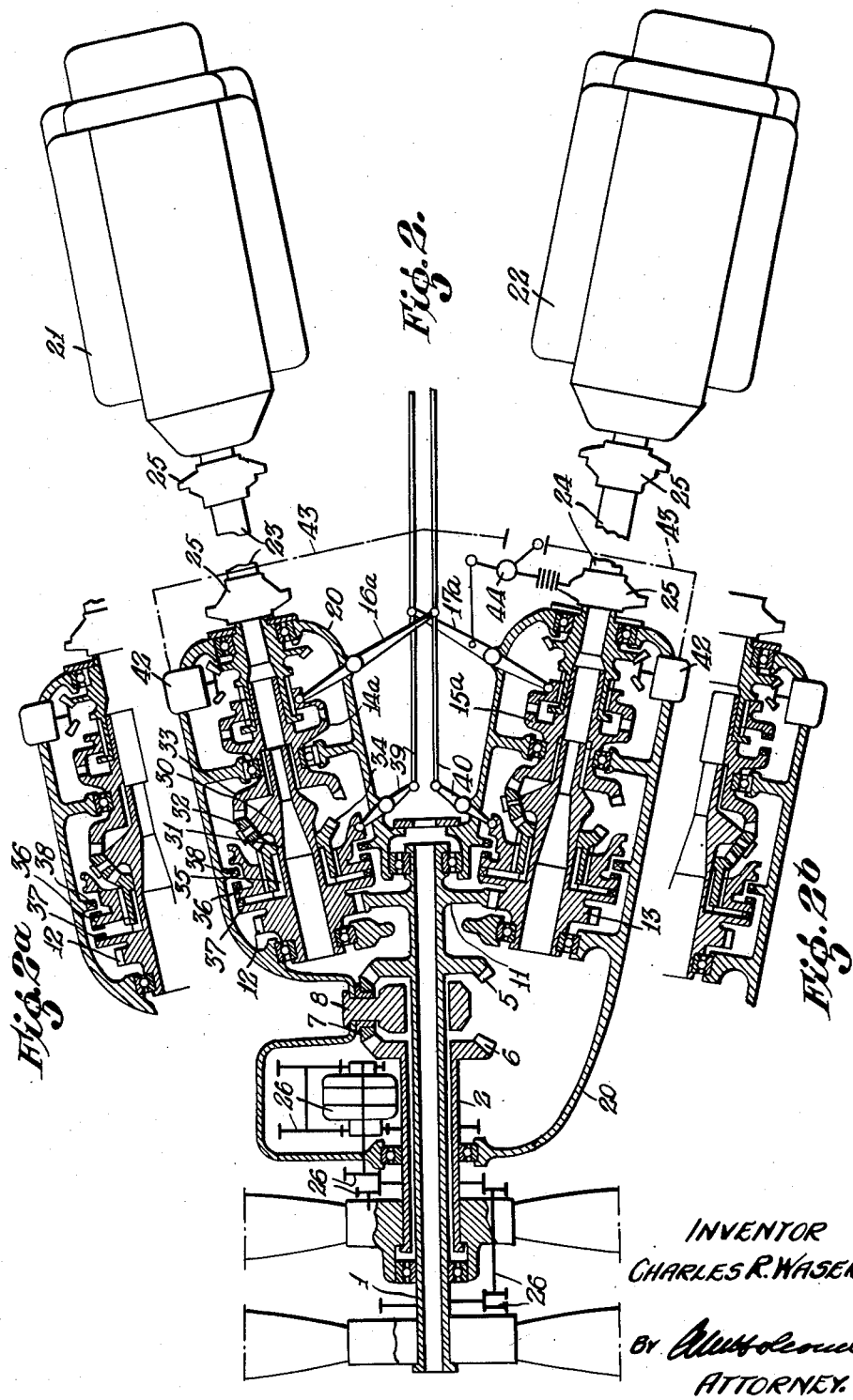

July 31, 1945.   C. R. WASEIGE   2,380,889
POLYENGINE BIPROPELLER DRIVE
Filed July 14, 1942   4 Sheets-Sheet 3
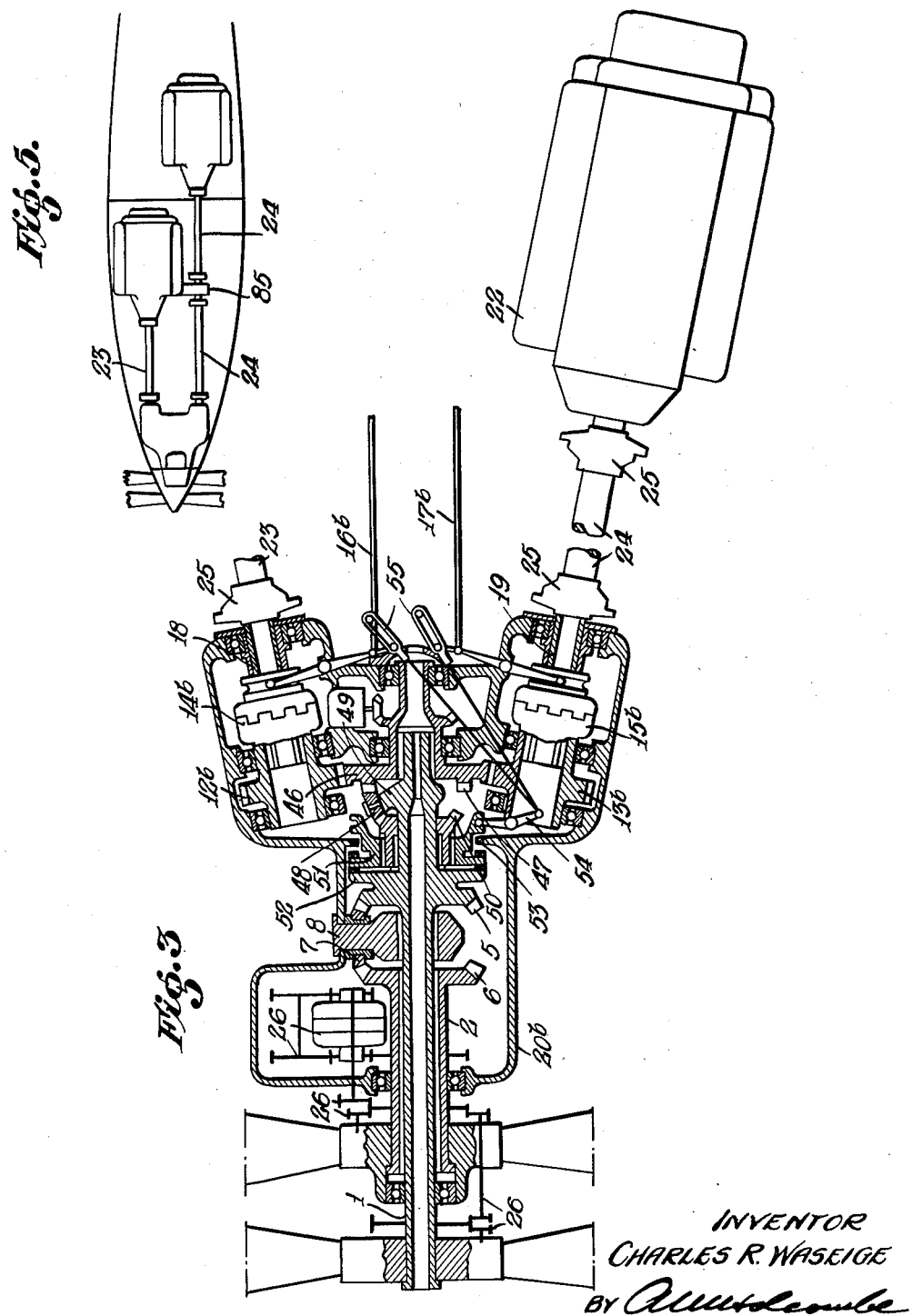
INVENTOR
CHARLES R. WASEIGE
BY [signature]
ATTORNEY.

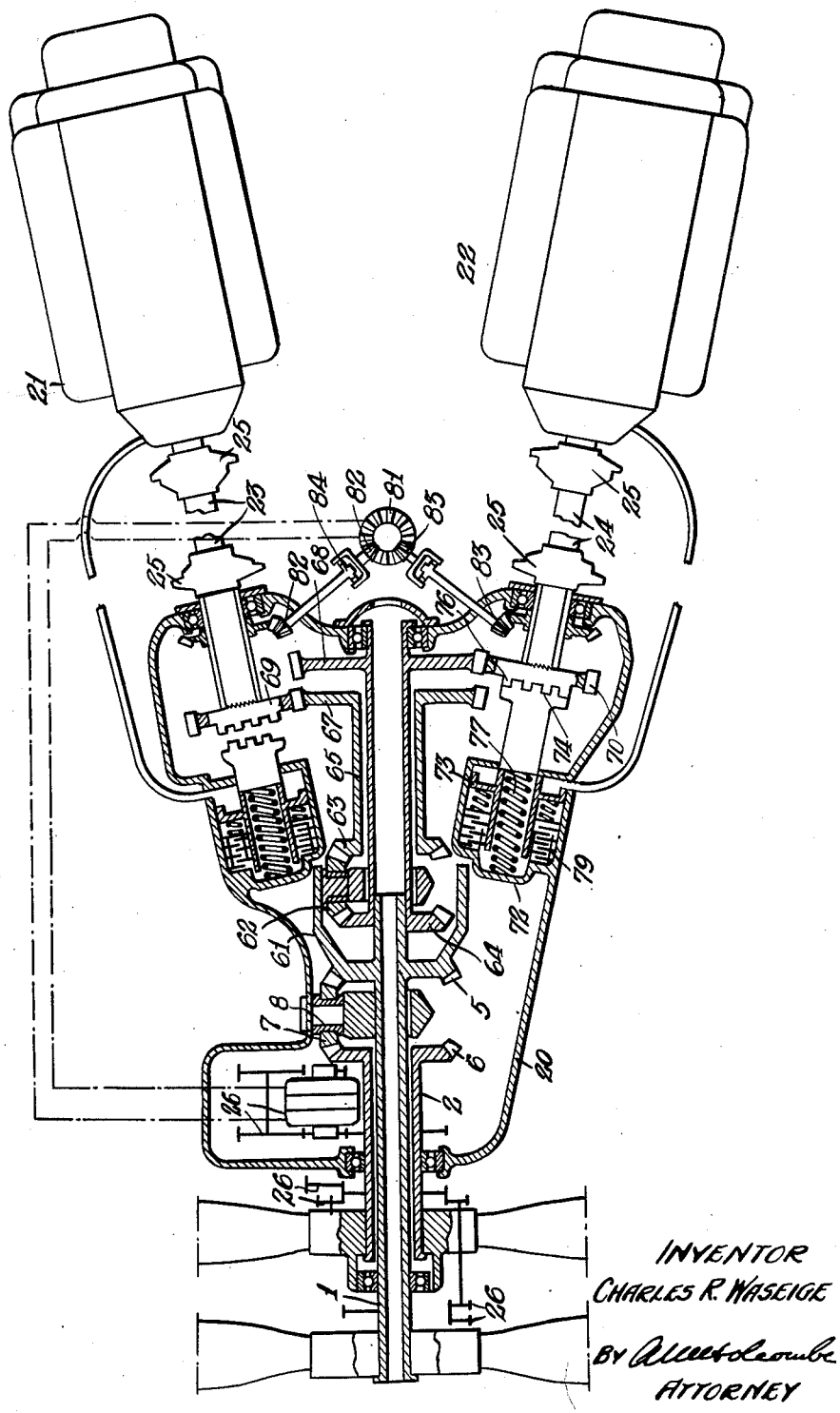

Patented July 31, 1945

2,380,889

UNITED STATES PATENT OFFICE 2,380,889

POLYENGINE BIPROPELLER DRIVE

Charles Raymond Waseige, Saint-Etienne, Loire, France; vested in the Alien Property Custodian Application July 14, 1942, Serial No. 450,935
In France July 26, 1941

2 Claims. (Cl. 170—135.6)

My invention has for its object to provide a polyengine and bipropeller group. Two-engine and two-propeller groups are known in which two coaxial propellers are driven in opposite directions, the first by one of the engines, the second by the other. These two engines rotate generally in opposite directions. On the other hand, the torques of the two propellers may only be mutually cancelled if they are equal at every instant. When an engine does not run the torque of the rotating propeller is no longer counterbalanced and unbalances the airplane, particularly in the case of a central two-engine group; the torque must be corrected through the controls; the propeller of the stopped engine exerts a substantial drag upon the forward motion, and the general fineness of the machine is decreased when only a part of the power is available.

On the other hand, in the case of variable pitch propellers, as the speeds of the two propellers are not constantly in the same ratio, two independent controls must be provided for adjusting the pitch.

The object of the present invention is, inter alia, to remedy, at least in part, the aforesaid failings and to increase the efficiency of the engine-propeller group and that of the aerodyne, particularly in case of stopping of one of the engines of the group, which may comprise any number of engines.

For this purpose, in a polyengine-bipropeller according to this invention, each of the engines is connected to both propellers, preferably rotating in opposite directions, so that each of these propellers is driven simultaneously by the various engines, through the medium of transmission means, inserted between each engine and the propeller assembly, elements which are proper to this particular engine and allow the driving member of said elements to be stopped while permitting the rotation of the driven member.

In such conditions, whichever the stopped engine may be, both propellers continue to be driven by the remaining power of the group and their torques remain in the same ratio. On the other hand the various engines may be engines rotating in the same direction.

In the ambit of this generic arrangement resulting from the generic inventive idea a number of embodiments are possible.

The said elements may consist in free-wheel devices or other one-way connections but, preferably, couplings controlled either by hand or automatically will be used, the automatic control being effected, for example, under the control of a member whose position is varied in accordance with a force which results from the engine operation, such as a force provided, for example, by a fluid compressed by the engine, an electric current generated when the engine is running, etc.

In a particular embodiment the two propeller shafts are connected together by a motion reversing gear comprising an intermediate shaft and one of these propeller shafts is connected to all of the various engines.

A further object of the invention is to reduce the braking of two propellers on the running engines when one of the engines is not rotating, in order that the portion of power still available may drive these propellers at a speed approximating that of the engines of the group in normal use.

In a particular arrangement the means used therefor consist simply in using variable pitch propellers.

In another embodiment, there is inserted a variable speed gear between each engine and the set of the two-propellers in a known manner per se.

In this way fixed pitch propellers may be used without overbraking the engines should one or several of them stop. This arrangement may also be combined with variable pitch propellers.

In another embodiment, the propeller set is driven through the medium of the planet-pinion carrier of a differential gear, one of whose sun wheels is driven by one half of the engines and the other by the second half, means being provided for stopping, preferably automatically, the sun wheel connected to the stopped engine.

A still further object of the invention is to control automatically these means adapted to reduce the braking action of the propellers on the engines in case of stopping of one engine. Such control may be made by hand or automatically, such as by similar means to those used as above-mentioned for controlling the couplings, all these details being further features of this invention.

In the simple case of a polyengine and bipropeller group without variable speed gear, one automatic pitch regulating device only may be provided for the propellers of this group, which device would be connected simultaneously with the various engines, being, for example, driven from any one of the propeller shafts, whether the propellers rotate at the same speed or at different speeds.

Alike would be the conditions when the variable speed gear which is inserted between the two propellers and the various engines, is common to the whole of the latter, said gear being then driven from one of the driving members of the variable speed gear.

As examples which are in nowise limitative several embodiments of the general arrangement which is the object of the present invention are schematically shown on the annexed drawings in the case of two engines.

In these drawings:

Fig. 2 shows another embodiment in which each propeller is driven by both engines through the medium of a variable speed gear.

Figs. 2a and 2b show the embodiment of Fig. 2 with one engine disconnected.

Fig. 3 shows an alternative to Fig. 2, in which a single variable speed gear is arranged between the propellers and the various engines.

Fig. 4 shows a third modification in which the engines are connected to the propeller assembly by means of a differential gear.

Fig. 5 shows an alternative to the arrangement of the engine whatever may be the way they are connected to the propellers.

Figure 1:
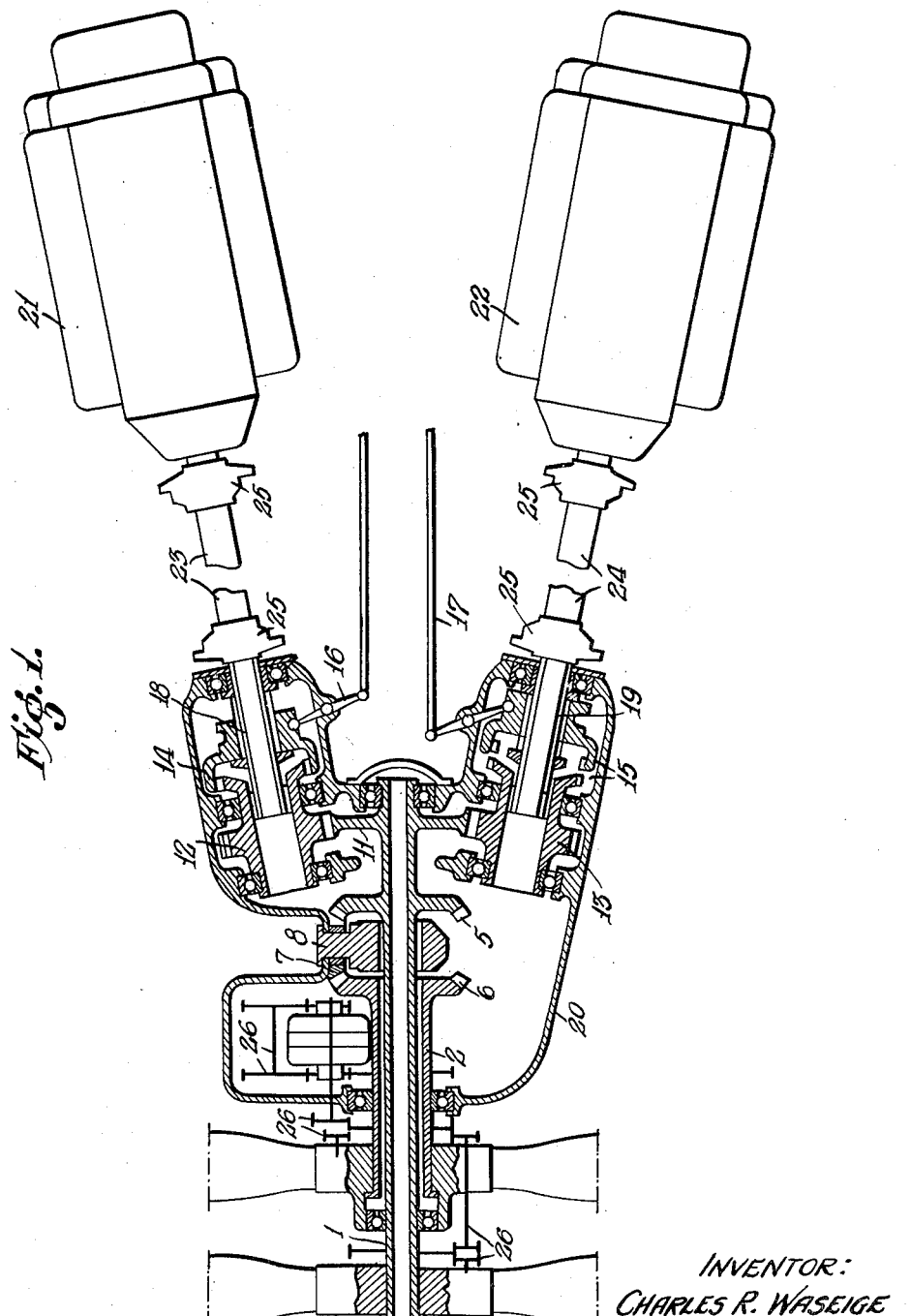
Fig. 1 shows a simple arrangement.

In the example of Fig. 1, the concentric shafts 1 and 2 of the two propellers are connected to each other by a reversing gear here shown as comprising two bevel gears 5 and 6 respectively keyed opposite each other on said propeller shafts 1, 2 and at least one bevel gear 7 meshing with both said bevel gears and carried by a stationary shaft 8. The inner shaft 1 is provided with a rearward extension carrying a gear 11 in mesh with two other smaller gears 12 and 13 arranged to rotate as one with the driven part of couplings 14, 15, respectively, assumed here to be claw clutches and provided with hand controls 16, 17, the driving part of these clutches being carried by a corresponding shaft 18, 19, respectively. The whole of the above-mentioned elements is arranged in a case 20 from which project only the ends of the two shafts 18, 19, which are respectively connected to two engines 21, 22, by means of transmission shafts 23, 24 and cardan joints 25 at the end of each of said shafts.

It is thus apparent that the two propellers 3 and 4 are compelled by the reversing gear 5, 6, 7, to rotate at the same speed and in opposite directions, while sharing the total torque applied to the common driving shaft, constituted here by the rear part of the inner propeller shaft. If both propellers have been designed to take the same torque at a common speed, such as, for example, that speed which corresponds to the normal operation of the engines, account being taken of their relative position, the two torques will be exactly balanced. On the other hand the two engines rotate in the same direction.

Should any one of the engines stop, the two propellers continue to be driven at the same speed and, in order that the engine speed may not be too much reduced from the normal, it is preferable that the propellers are of the variable pitch type and that their pitch be varied, either automatically or by hand, which may be carried out through a number of known means. Thus, for example, as pitch varying mechanism for the two propellers one may advantageously use that described in U. S. Patent No. 2,236,841 and U. S. patent application No. 306,564, filed in the name of the present applicant and entitled "Variable pitch aerial propellers." This mechanism has been schematically shown and its various members are indicated at 26. The automatic control of this mechanism may be effected by means of a centrifugal governor of a known type, not shown, connected to both engines, this governor being, for example, driven from one of the elements of the transmission common to both engines.

When one of the engines has stopped, it is uncoupled by means of the mechanisms 14—16 or 15—17, which may, if desired, be automatically controlled by known means, such as, for example, under the influence of a movable member acted upon by a force resulting from the engine operation, such as a force produced by a fluid maintained under pressure by the engine, an electric current generated by a generator driven by said engine, etc.

In the example of embodiment of Fig. 2, the two propeller shafts are connected to each other by a reversing gear driven by means of two reducers, the same as in the preceding example, the only difference being that a variable speed gear is inserted between the coupling 14a, 15a and the corresponding reducer 12—11, 13—11. These variable speed gears are here of the epicyclic type with conical planet pinions, and each of them comprises a planet pinion carrier 30, on the shaft 31 of which is keyed the pinion 12, 13 of the corresponding reducing gear. The planet pinions 32 mesh simultaneously with sun wheels 33, 34 of different diameters, the larger of which, 33, rotates as one with the driven part of the coupling 14a, 15a and the smaller, 34, rotates as one with a sleeve 35 freely carried by the shaft 30 and on which is slidingly splined a clutch sleeve 36 which may be shifted by means of a control mechanism 39, 40 so as to be brought selectively into mesh either with a corresponding set of teeth 37 of the pinion wheel 12, 13 or with a fixed toothing 38 carried by the case. Preferably, as shown, the control mechanism 39, 40 of the variable speed gear of one of the engines 21, 22 is conjugated, as shown, to the control mechanism 17a, 16a of the coupling 15a, 14a of the other engine, though it might also be independent.

When both engines 21, 22 rotate and are in gear, each of the clutch sleeves 36 of the two variable speed gears is in mesh with the claws 37 of the corresponding pinions 12, 13. The latter are thus directly connected with the sun wheels 34, which are consequently made unmovable with regard to the planet pinions, and each epicyclic assembly turns as a block, the propellers being thus directly driven by the engines. By unclutching one of the engines 21, 22, that of the controls 39, 40 of the variable speed gears which is associated with the operated uncoupling control 17a or 16a, will disengage the corresponding clutch sleeve 36 from the claws of pinion 12 or 13 and brings it into engagement with the fixed set of teeth 38 of the case 20. The sun wheel 34 is thus released from the planet pinion carrier 30, which may then rotate relatively to said sun wheel, and secured to the case. Speed reducing is consequently effected.

By a proper design one may so choose the reducing gear ratio that the engine which remains in operation rotates at a speed approximating its normal value, while the propellers, the pitch of which may then be fixed, turn at a slower speed. There may be an advantage in using variable pitch propellers, as this permits choosing a reducing ratio and a pitch which, by their combination, assures adaptation of the propellers to the various conditions of operation. If an automatic pitch control is effected by means of a centrifugal governor, so that the speed of the engines may be maintained substantially constant, two centrifugal governors, 42, of a known type, may be used, as here shown schematically, one of them being driven by one of the engines and the second by the other engine, only one of these governors 42 being in operation at any time; for example, as shown, these governors act upon the pitch varying mechanism 26 by means of electric circuits 43 leading to a reversing switch 44 which will close the one or the other of said circuits in dependance on the running or the stopping of a given engine, for example on account of it being connected to the coupling control of one of the engines, so that it may be controlled thereby, i. e. here by the control 17a.

One may also use a single adjustable governor driven from any one of the propeller shafts, or again a single governor—adjustable or not—connected to each of the engines through the medium of free-wheel devices.

In the alternative embodiment shown in Fig. 3, there is used only one variable speed gear which is then common to the various engines. The propellers are connected to each other through a reversing gear, as in Figs. 1 and 2, and the engines drive through transmission shafts and cardan devices, as in Figs. 1 and 2, couplings 14b and 15b, similar to the couplings 14 and 15 of Fig. 1, and pinions 12b and 13b, similar to pinions 12 and 13, said pinions 12b and 13b meshing with a common wheel 46 which is freely supported coaxially with the propellers and carries a set of teeth 47 meshing with conical planet pinions 48 supported by means of arms 49 on the inner propeller shaft 1. Said planet pinions 48 gear besides with a smaller wheel 50 loose on the shaft 1 and on said wheel is slidingly keyed a clutching sleeve 51 having two sets of claws adapted to be brought by sliding motion of the sleeve 51 into engagement either with a set of claws 52 fast with the shaft 1, or with a set of claws 53 fast with the case 20b. The operation of this variable speed gear is similar to that of the variable speed gear shown in Fig. 2. Shifting of the sleeve 51 is effected by means of a control 54 connected by rods and links 55 to both unclutching controls 16b and 17b so that uncoupling of any one of the engines causes the sleeve 51 to be brought into engagement with the claws 53.

This modification, though simpler than that of Fig. 2, gives the same results as the latter and lends itself to the same combinations. Moreover, if variable pitch propellers are used the pitch of which is automatically controlled by means of a centrifugal governor, only one centrifugal governor is needed. Fig. 3 shows a way of mounting the same. Said governor 56 is housed in the case 20b and carries a pinion 57 meshing with a pinion 58 integral with the wheel 46, i. e. the driving member of the variable speed gear consisting of the members 46 to 53.

In the modification of Fig. 4, the pinion 5 driving the reversing gear, by means of which the two propellers are again connected together, as in the preceding examples, is integrally connected with the planet pinion carrier 61 to partake of the rotation thereof, the conical planet pinion 62 meshing with two coaxial sun wheels 63, 64, which are of the same size and keyed on concentric shafts 65, 66, respectively. On these shafts are also secured toothed wheels 67 and 68, respectively, which mesh respectively with a pinion 69, keyed on the shaft coming from the engine 21, and a pinion 70, secured to the shaft coming from the engine 22. The gearings 69—67 and 70—68 constitute reducing gears.

The assembly 62—66, thus constituted, forms a differential gear whose planet-carrier 61 rotates at a speed which is the mean of the speeds of the sun wheels 63, 64. In case of stopping of any one of the engines, the planet-carrier 61 will rotate at a speed which is the half of that of the sun wheel still rotating. The speed of the propellers is thus reduced by one half, and it will be necessary, the same as in the case of Fig. 1, that their pitch may be varied, though the reason for doing so, in the present case, is to avoid racing of the remaining engine by increasing the pitch. In order to prevent the stopped engine from rotating in the opposite direction to its normal direction of rotation, this embodiment according to Fig. 4 is preferably completed by the provision of means to stop selectively the sun wheels of the differential gear. These means consist as shown in providing for each sun wheel a fixed cylinder 72 in which is slidingly guided a piston 73 carrying outside the cylinder a head 74 provided with sets of claws adapted to be brought into engagement with complementary sets of claws 75 provided on the corresponding pinion 69 or 70. The piston 73 is urged by a spring 77 tending to engage the head 74 with the claws 76 against the action on said piston of a fluid under pressure introduced into said cylinder through a pipe 78 from the oil circuit of the engine. Said piston 73 is further connected with the cylinder 72 by means of a torque limiting device 79. When the engine is in operation the fluid pressure drives the piston 73 against the action of the spring 77 so that the corresponding pinion 69 or 70 may freely rotate. As soon as the oil pressure is lowered, the spring 77 shifts the piston 73, whose head 74 engages the claws 76, which stops the corresponding pinion 69 or 70 and, consequently, the sun wheel 63 or 64, the differential gear thus forming a reducing gear with a ratio 1/2 between the running engine and the propellers. The torque limiting device 79 reduces the impact at stopping.

Fig. 4 shows also a way of carrying out the pitch variable control for the propellers by means of a single centrifugal governor in order that the speed of the engine may remain constant. This governor is driven by a pinion 81 connected with the various shafts by means of trains of gears 82, 83, with the interposition of one-way couplings 84 for insuring that the governor will be driven only from the engine running at the greatest speed, so that it will continue to be driven should one of the engines fail.

In the various embodiments above-described, the engines are shown inclined to the axis of the propellers and symmetrically arranged on each side of said axis. However, whatever which way the invention may otherwise have been carried out, these engines may also be arranged parallelly to said propeller axis, as shown in Fig. 5, one of them being then located forward of the other and the transmission shaft from the most removed engine being divided into two parts connected by means of cardan joints or the like with a short shaft supported in an intermediate bearing 85.

Obviously, the invention is in nowise limited to the details of the modifications shown and described, which are only indicated as examples.

Thus, instead of the various engines driving the same wheel keyed on one of the two propeller shafts which are connected together by a reversing gear, another wheel may be provided on the second propeller shaft, some of the engines driving the first of these wheels and the others the second.

On the other hand, instead of connecting the two propeller shafts by means of a reversing gear, these shafts may each carry a toothed wheel and these two wheels may be driven simultaneously by all the engines, the connection between the two wheels and each engine comprising for each wheel a supplementary reversing wheel if it is desired to have the two propeller shafts rotating in opposite directions.

Moreover, in the case of the modifications comprising variable speed gears, the latter may further comprise a special control adapted to be operated by the pilot without uncoupling the engine, such as on taking off, for example.

Likewise, the device for driving a single centrifugal, which is shown in Fig. 4, may be applied to the embodiments of Figs. 2 and 3. This device shown in Fig. 4 with a single centrifugal governor may also be substituted with two governors as per Fig. 3, the electric reversing apparatus being then operated by the movement on one of the pistons 74. Lastly, in the three cases of Figs. 2, 3 and 4, in view of using only a single centrifugal governor, the latter may be of an adjustable type and adapted to be driven by any one of the propeller shafts.

What I claim is:

1. In a power plant for a dual engined aircraft, the combination of a pair of co-axial shafts; gearing connecting said shafts; a propeller mounted on each shaft; a gear mounted on one of said shafts; two gears meshing with said gear; a pair of engines each having a driving shaft; a change speed mechanism connected with each of said last mentioned gears; a clutch connecting each driving shaft with one of said change speed mechanisms; means to operate each of said change speed mechanisms independently; means to operate each of said clutches independently, a connection between the operating means for each clutch and the operating means for the change speed mechanism connected by the other clutch, so that when either clutch is unclutched the change speed mechanism of the other clutch is shifted to low speed.

2. In a power plant for a dual engined aircraft, the combination of a pair of co-axial shafts; gearing connecting said shafts; a propeller mounted on each shaft; means for varying the pitch of the propellers; a gear mounted on one of said shafts; two gears meshing with said gear; a pair of engines each having a driving shaft; a change speed mechanism connected with each of said last mentioned gears; a clutch connecting each driving shaft with one of said change speed mechanisms; means to operate each of said change speed mechanisms independently; means to operate each of said clutches independently, a connection between the operating means for each clutch and the operating means for the speed change mechanism connected by the other clutch, so that when either clutch is unclutched the change speed mechanism of the other clutch is shifted to low speed; and means controlling the pitch varying means and actuated by the said gear on the one of the co-axial shafts.

CHARLES RAYMOND WASEIGE.